United States Patent
Terasawa et al.

(10) Patent No.: US 12,128,466 B2
(45) Date of Patent: Oct. 29, 2024

(54) ROLL PRESS DEVICE AND CONTROL DEVICE

(71) Applicant: Panasonic Intellectual Property Management Co., Ltd., Osaka (JP)

(72) Inventors: Fumihiro Terasawa, Osaka (JP); Yoshihiro Miyoshi, Osaka (JP); Naoyuki Koide, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 587 days.

(21) Appl. No.: 17/289,212

(22) PCT Filed: Oct. 25, 2019

(86) PCT No.: PCT/JP2019/042039
§ 371 (c)(1),
(2) Date: Apr. 27, 2021

(87) PCT Pub. No.: WO2020/100561
PCT Pub. Date: May 22, 2020

(65) Prior Publication Data
US 2021/0394246 A1 Dec. 23, 2021

(30) Foreign Application Priority Data
Nov. 13, 2018 (JP) .................. 2018-213017

(51) Int. Cl.
*B21B 37/38* (2006.01)
*B21B 29/00* (2006.01)
(Continued)

(52) U.S. Cl.
CPC .............. *B21B 37/38* (2013.01); *B21B 29/00* (2013.01); *B21B 38/04* (2013.01); *B21C 51/00* (2013.01);
(Continued)

(58) Field of Classification Search
CPC ....... B21B 37/38; B21B 37/165; B21B 37/16; B21B 37/28; B21B 37/58; B21B 29/00;
(Continued)

(56) References Cited

U.S. PATENT DOCUMENTS 8,531,680 B2 9/2013 Minakuchi
2011/0249276 A1 10/2011 Minakuchi

FOREIGN PATENT DOCUMENTS

CN 103128987 A * 6/2013
JP 2013-111647 A 6/2013
(Continued)

OTHER PUBLICATIONS

Machine translation of CN-103128987-A (Year: 2013).*
(Continued)

*Primary Examiner* — Christopher L Templeton
*Assistant Examiner* — Teresa A Guthrie
(74) *Attorney, Agent, or Firm* — Rimon P.C.

(57) ABSTRACT

In a roll press device, a thickness meter is provided on the exit side of first and second pressure rollers and detects the thickness of an electrode plate of a secondary battery at three or more points in the width direction of the electrode plate. From thickness measurement values at the three or more points and a thickness target value, a calculation unit calculates three feature amounts: the deviation between a thickness measurement value at the central point among the three or more points and the thickness target value, the quadratic component of the thickness profile of the electrode plate, and the linear component of the thickness profile of the electrode plate, and adaptively changes the respective pressure setting values of the first press mechanism, the second press mechanism, the first bend mechanism, and the second bend mechanism based on the three feature amounts.

8 Claims, 7 Drawing Sheets

(51) Int. Cl.
  *B21B 38/04* (2006.01)
  *B21C 51/00* (2006.01)
  *B30B 3/00* (2006.01)
  *H01M 4/04* (2006.01)
  *H01M 4/139* (2010.01)

(52) U.S. Cl.
  CPC ............. *B30B 3/00* (2013.01); *H01M 4/0435* (2013.01); *H01M 4/139* (2013.01); *B21B 2269/04* (2013.01)

(58) Field of Classification Search
  CPC . B21B 38/04; B21B 2269/04; B21B 2261/04; B21C 51/00; B30B 3/00; H01M 4/0435; H01M 4/139
  USPC ............................................................ 72/9.1
  See application file for complete search history.

(56) References Cited

FOREIGN PATENT DOCUMENTS

| | | | |
|---|---|---|---|
| JP | 2014-042923 | A | 3/2014 |
| JP | 2016-064441 | A | 4/2016 |
| JP | 2016-115406 | A | 6/2016 |
| KR | 100362662 | B1 * | 2/2003 |
| KR | 20090056145 | A * | 6/2009 |
| WO | 2010082335 | A1 | 7/2010 |

OTHER PUBLICATIONS

Machine translation of KR-100362662-B1 (Year: 2003).*
Machine translation of KR-20090056145-A (Year: 2009).*
International Search Report issued in corresponding International Patent Application No. PCT/JP2019/042039, dated Jan. 21, 2020, with English translation.

* cited by examiner

ROLL PRESS DEVICE AND CONTROL DEVICE

CROSS-REFERENCE OF RELATED APPLICATIONS

This application is the U.S. National Phase under 35 U.S.C. § 371 of International Patent Application No. PCT/JP2019/042039, filed on Oct. 25, 2019, which in turn claims the benefit of Japanese Patent Application No. 2018-213017, filed on Nov. 13, 2018, the entire disclosures of which Applications are incorporated by reference herein.

TECHNICAL FIELD

The present invention relates to a roll press device for rolling an electrode plate of a secondary battery and a control device.

BACKGROUND ART

In recent years, shipments of secondary batteries have been increasing with the spread of electric vehicles (EV), hybrid vehicles (HV), and plug-in hybrid vehicles (PHV). In particular, shipments of lithium-ion secondary batteries are increasing. A general secondary battery has a positive electrode, a negative electrode, a separator, and an electrolytic solution as main components. A roll press device is used in a compression processing step, which is one of the steps of manufacturing a positive electrode plate and a negative electrode plate of a secondary battery (see, for example, Patent Document 1).

[Patent Document 1] Japanese Unexamined Patent Application Publication No. 2013-111647

DISCLOSURE OF INVENTION

In a process of compressing the electrode plate in a roll press device, a thickness accuracy of about 2 μm or less is generally required. Due to changes in the coating film thickness of the electrode material in the previous process and changes in the outer diameter of the roll bite due to heat generated by the compression process, the thickness changes in the length direction and width direction during the compression process. When the thickness exceeds a range to be managed, it is necessary to stop the line and manually reset the press conditions so as to adjust the thickness to be within the management range, and it is necessary to remove the part of the thickness that cannot be applied in the product. Therefore, the equipment utilization rate and the yield are decreased.

In recent years, there has been an increasing demand for achieving high capacity while being compact and lightweight or for achieving high capacity at the same manufacturing cost. In the design of batteries, the length of the electrode is determined so as to fit in a battery case in both a cylindrical shape and a square shape. Even if the length of the electrode is the same, if the thickness is large, the winding diameter when the electrode is wound becomes large. Therefore, the length of the electrode is determined in consideration of the range of thickness variation generated in manufacturing. That is, if the thickness accuracy can be increased, the length of the electrode can be increased, thus allowing a battery with higher capacity to be designed.

In this background, a purpose of the present disclosure is to provide a technique for improving the accuracy of thickness control of a roll press device.

A roll press device according to one embodiment of the present disclosure includes: a first pressure roller and a second pressure roller that sandwich an electrode plate of a secondary battery that is continuously conveyed, thereby rolling the electrode plate; a first main bearing part and a second main bearing part that are provided on one side and the other side of a rotating shaft of the first pressure roller, respectively, and that rotatably support the rotating shaft; a third main bearing part and a fourth main bearing part that are provided on one side and the other side of a rotating shaft of the second pressure roller, respectively, and that rotatably support the rotating shaft; a first bend bearing part and a second bend bearing part that are provided on one side and the other side of a rotating shaft of the first pressure roller, respectively, and that rotatably support the rotating shaft; a third bend bearing part and a fourth bend bearing part that are provided on one side and the other side of a rotating shaft of the second pressure roller, respectively, and that rotatably support the rotating shaft; a first press mechanism that is capable of applying a load to at least one of the first main bearing part and the third main bearing part in a direction in which the first pressure roller and the second pressure roller become close to each other; a second press mechanism that is capable of applying a load to at least one of the second main bearing part and the fourth main bearing part in a direction in which the first pressure roller and the second pressure roller become close to each other; a first bend mechanism that is capable of applying a load to the first bend bearing part and the third bend bearing part in a direction in which the first pressure roller and the second pressure roller become separated from or close to each other; a second bend mechanism that is capable of applying a load to the second bend bearing part and the fourth bend bearing part in a direction in which the first pressure roller and the second pressure roller become separated from or close to each other; a thickness meter that is provided on the exit side of the first and second pressure rollers and that detects the thickness of the electrode plate of the secondary battery at three or more points in the width direction of the electrode plate; a calculation unit that calculates the respective pressure setting values of the first press mechanism, the second press mechanism, the first bend mechanism, and the second bend mechanism on the basis of thickness measurement values at the three or more points that are based on detection values from the thickness meter and of a thickness target value; and a pressure control unit that controls each load in the first press mechanism, the second press mechanism, the first bend mechanism, and the second bend mechanism based on the pressure setting values calculated by the calculation unit. The calculation unit calculates three feature amounts: the deviation between a thickness measurement value at the central point among the three or more points and the thickness target value, the quadratic component of the thickness profile of the electrode plate, and the linear component of the thickness profile of the electrode plate, and adaptively changes the respective pressure setting values of the first press mechanism, the second press mechanism, the first bend mechanism, and the second bend mechanism based on the three feature amounts.

According to the present disclosure, the accuracy of thickness control of a roll press device can be improved.

DESCRIPTION OF EMBODIMENTS

Figure 1:
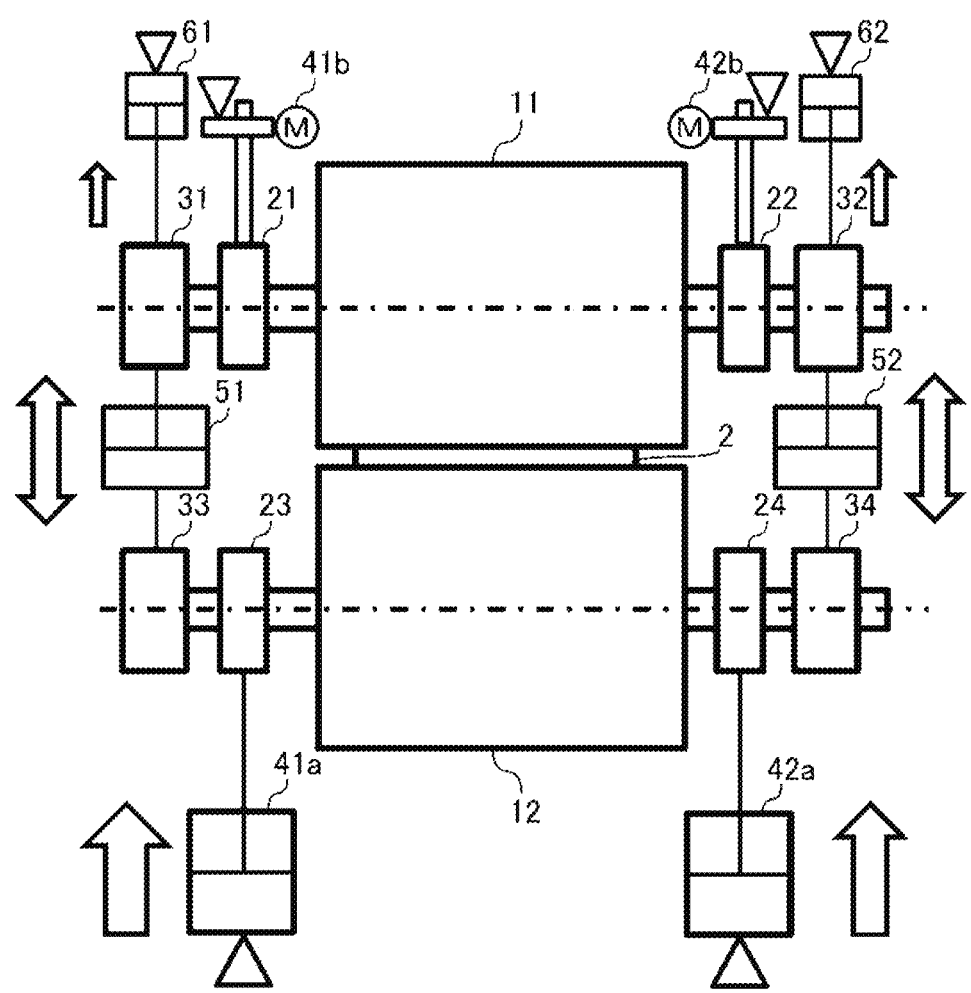
FIG. 1 is a schematic front view of a roll press device according to an embodiment of the present disclosure.

FIG. 1 is a schematic front view of a roll press device according to an embodiment of the present disclosure. A first pressure roller 11 and a second pressure roller 12 are a pair of upper and lower roll bites and are installed so as to face each other in a detachable manner. The pair of first and second pressure rollers 11 and 12 sandwiches an electrode plate 2 of a secondary battery that is continuously conveyed, thereby rolling the electrode plate 2. The electrode plate 2 of the secondary battery passed through the roll press device is a sheet-like electrode material obtained by applying a slurry containing an active material to a metal foil followed by drying. For example, a positive electrode plate of a lithium ion secondary battery is produced by applying a slurry containing a positive electrode active material such as lithium cobalt oxide or lithium iron phosphate on an aluminum foil. Further, a negative electrode plate of the lithium ion secondary battery is produced by applying a slurry containing a negative electrode active material such as graphite on a copper foil. Most of the thickness of the electrode plate 2 passed through the roll press device is the thickness of the applied active material.

A first main bearing part 21 and a second main bearing part 22 are provided on one side and the other side of a rotating shaft of the first pressure roller 11, respectively, and rotatably support the rotating shaft. A third main bearing part 23 and a fourth main bearing part 24 are provided on one side and the other side of a rotating shaft of the second pressure roller 12, respectively, and rotatably support the rotating shaft.

A first bend bearing part 31 and a second bend bearing part 32 are provided on one side and the other side of the rotating shaft of the first pressure roller 11, respectively, and rotatably support the rotating shaft. A third bend bearing part 33 and a fourth bend bearing part 34 are provided on one side and the other side of the rotating shaft of the second pressure roller 12, respectively, and rotatably support the rotating shaft.

In an example shown in FIG. 1, the first main bearing part 21 to the fourth main bearing part 24 and the first bend bearing part 31 to the fourth bend bearing part 34 is each formed by a bearing box that houses a bearing that rotatably supports the rotating shaft of the roller.

In the example shown in FIG. 1, the first bend bearing part 31 to the fourth bend bearing part 34 are arranged outside the first main bearing part 21 to the fourth main bearing part 24, respectively. However, the first bend bearing part 31 to the fourth bend bearing part 34 may be arranged inside the first main bearing part 21 to the fourth main bearing part 24, respectively.

A first press mechanism 41 is a mechanism capable of applying a load to at least one of the first main bearing part 21 and the third main bearing part 23 in a direction in which the first pressure roller 11 and the second pressure roller 12 become close to each other. A second press mechanism 42 is a mechanism capable of applying a load to at least one of the second main bearing part 22 and the fourth main bearing part 24 in a direction in which the first pressure roller 11 and the second pressure roller 12 become close to each other.

In the example shown in FIG. 1, as the first press mechanism 41, a first press cylinder 41a capable of applying a load to the third main bearing part 23 and a first electric screw-down device 41b capable of applying a load to the first main bearing part 21 is provided. As the second press mechanism 42, a second press cylinder 42a capable of applying a load to the fourth main bearing part 24 and a second electric screw-down device 42b capable of applying a load to the second main bearing part 22 are provided.

The first bend mechanism 51 (in the example shown in FIG. 1, a first bend cylinder) is a mechanism provided between the first bend bearing part 31 and the third bend bearing part 33 and capable of applying a load in a direction in which the first pressure roller 11 and the second pressure roller 12 become separated from or close to each other. The second bend mechanism 52 (in the example shown in FIG. 1, a second bend cylinder) is a mechanism provided between the second bend bearing part 32 and the fourth bend bearing part 34 and capable of applying a load in a direction in which the first pressure roller 11 and the second pressure roller 12 become separated from or close to each other.

A roll gap between the first pressure roller 11 and the second pressure roller 12 is controlled by pressure change in the first press mechanism 41 and/or the second bend mechanism 52 caused by a pressure control unit 819 (see FIG. 3) described later. The roll deflection also changes as the roll gap changes. The amount of roll deflection can be corrected by pressure change in the first bend mechanism 51 and/or the second bend mechanism 52 caused by the pressure control unit 819. At that time, the roll gap also changes, which has the opposite effect of the pressure change caused by the first press mechanism 41 and/or the second bend mechanism 52.

A first preload mechanism 61 (a first preload cylinder in the example shown in FIG. 1) is a mechanism applying a constant load to the first bend bearing part 31 in a direction in which the first pressure roller 11 and the second pressure roller 12 become separated from or close to each other. A second preload mechanism 62 (a second preload cylinder in the example shown in FIG. 1) is a mechanism applying a constant load to the second bend bearing part 32 in a direction in which the first pressure roller 11 and the second pressure roller 12 become separated from or close to each other. The pressures of the first preload cylinder and the second preload cylinder are fixed and are always set to the same pressure.

In the example shown in FIG. 1, the first preload mechanism 61 and the second preload mechanism 62 are applying a preload equal to or greater than the weight of the first pressure roller 11 to the first bend bearing part 31 and the second bend bearing part 32. Thereby, the first pressure roller 11 is appropriately pressed (pulled) upward so as to reduce the influence of rattling of the roll press device. The first preload mechanism 61 and the second preload mechanism 62 can be omitted.

Figure 2:
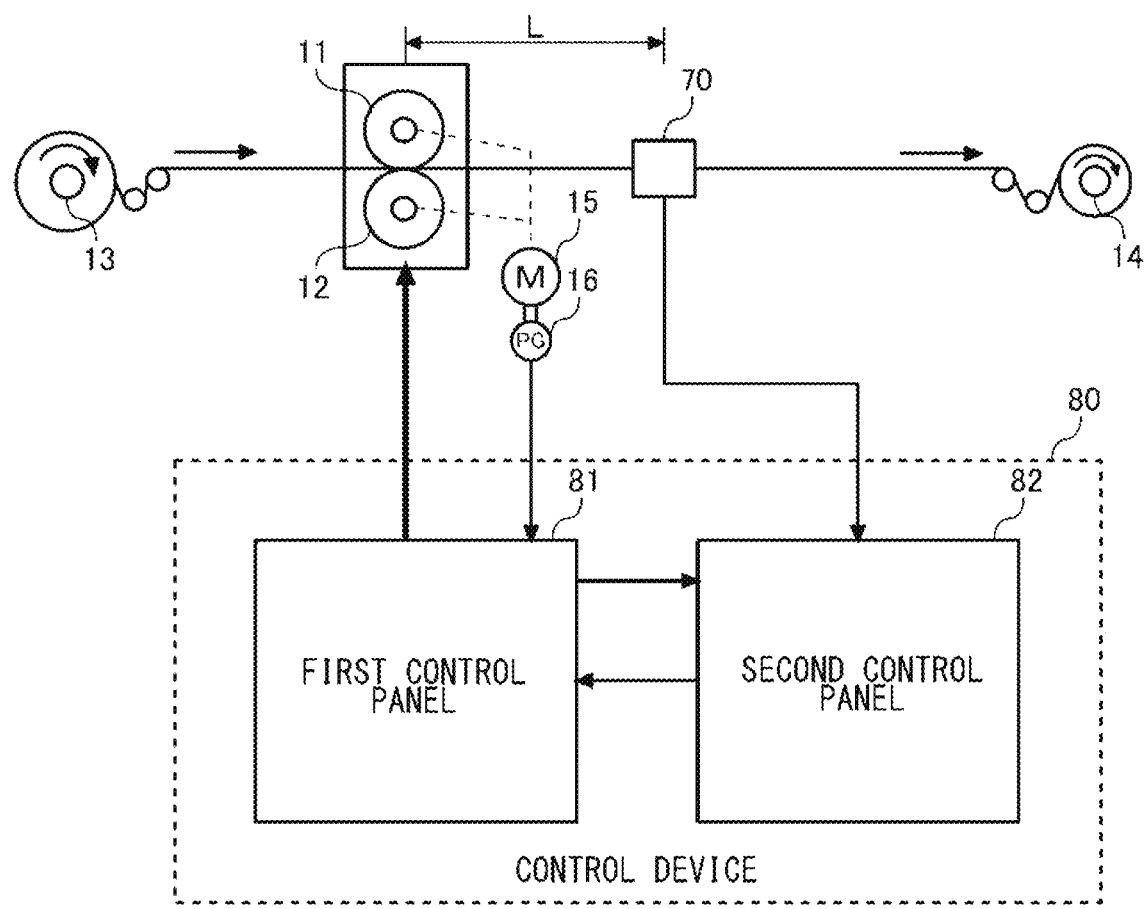
FIG. 2 is a schematic side view of the roll press device according to the embodiment of the present disclosure.

FIG. 2 is a schematic side view of the roll press device 1 according to the embodiment of the present disclosure. An unwinder 13 is installed on the entry side of the pair of the first and second pressure rollers 11 and 12, and a winder 14 is installed on the exit side. The unwinder 13 unwinds the sheet-like electrode plate 2 wound in a coil shape toward the pair of the first and second pressure rollers 11 and 12. The winder 14 winds up the electrode plate 2 compressed by the pair of the first and second pressure rollers 11 and 12.

A motor 15 is a motor that drives the first pressure roller 11 and the second pressure roller 12. A pulse generator 16 is attached to the motor 15 for driving and detects the rotation speed of the motor 15.

A thickness meter 70 is provided on the exit side of the pair of the first and second pressure rollers 11 and 12 and detects the thickness of the electrode plate 2 at three points, the first point, the second point, and the third point, arranged in the width direction of the electrode plate 2. The first point is set at the end of the electrode plate 2 on the side where the first press mechanism 41 is provided. The second point is set at the center part of the electrode plate 2. The third point is set at the end of the electrode plate 2 on the side where the second press mechanism 42 is provided.

In a general roll press device 1, a screen that is operated by an operator is installed on the side (the second press mechanism 42 side in the present embodiment) that is opposite to the side where the motor 15 is installed (the first press mechanism 41 side in the present embodiment). Thus, hereinafter, in the present embodiment, the first point is referred to as a driving side, the second point is referred to as a central part, and the third point is referred to as an operating side. That is, the thickness meter 70 detects the thicknesses on the driving side, the thickness at the central part, and the thickness on the operating side of the electrode plate 2 after the compression process.

The thickness meter 70 may extract the thicknesses on the driving side, the thickness at the central part, and the thickness on the operating side by causing one thickness detection sensor to scan the electrode plate 2 in the width direction so as to continuously detect the thickness of the electrode plate 2.

Further, the thickness meter 70 may be installed with three thickness detection sensors fixed on the driving side, at the central part, and on the operating side, respectively, such that the three thickness detection sensors detect the thicknesses on the driving side, at the central part, and on the operating side.

As a detection method of the thickness meter 70, a method may be used by which distances between both sides of the electrode plate 2 are detected by using a laser sensor or an optical sensor so as to detect the thickness based on the positional relationship for the distances. Further, a method may be used in which a magnetic sensor detects the change in the eddy current so as to detect the distance to the outer diameter surface of the electrode plate 2 and a laser sensor or an optical sensor detects the distance to the surface of the electrode plate 2 on the guide roll so as to detect the thickness based on the positional relationship between the guide roll and the surface of the electrode plate 2.

A control device 80 is a device for controlling the entire roll press device 1 and includes a first control panel 81 and a second control panel 82 in the example shown in FIG. 2. The first control panel 81 is a press-based control panel, and the second control panel 82 is a thickness-based control panel. A rotation pulse generated by the pulse generator 16 is input to the first control panel 81. A thickness detection value detected by the thickness meter 70 is input to the second control panel 82.

Figure 3:
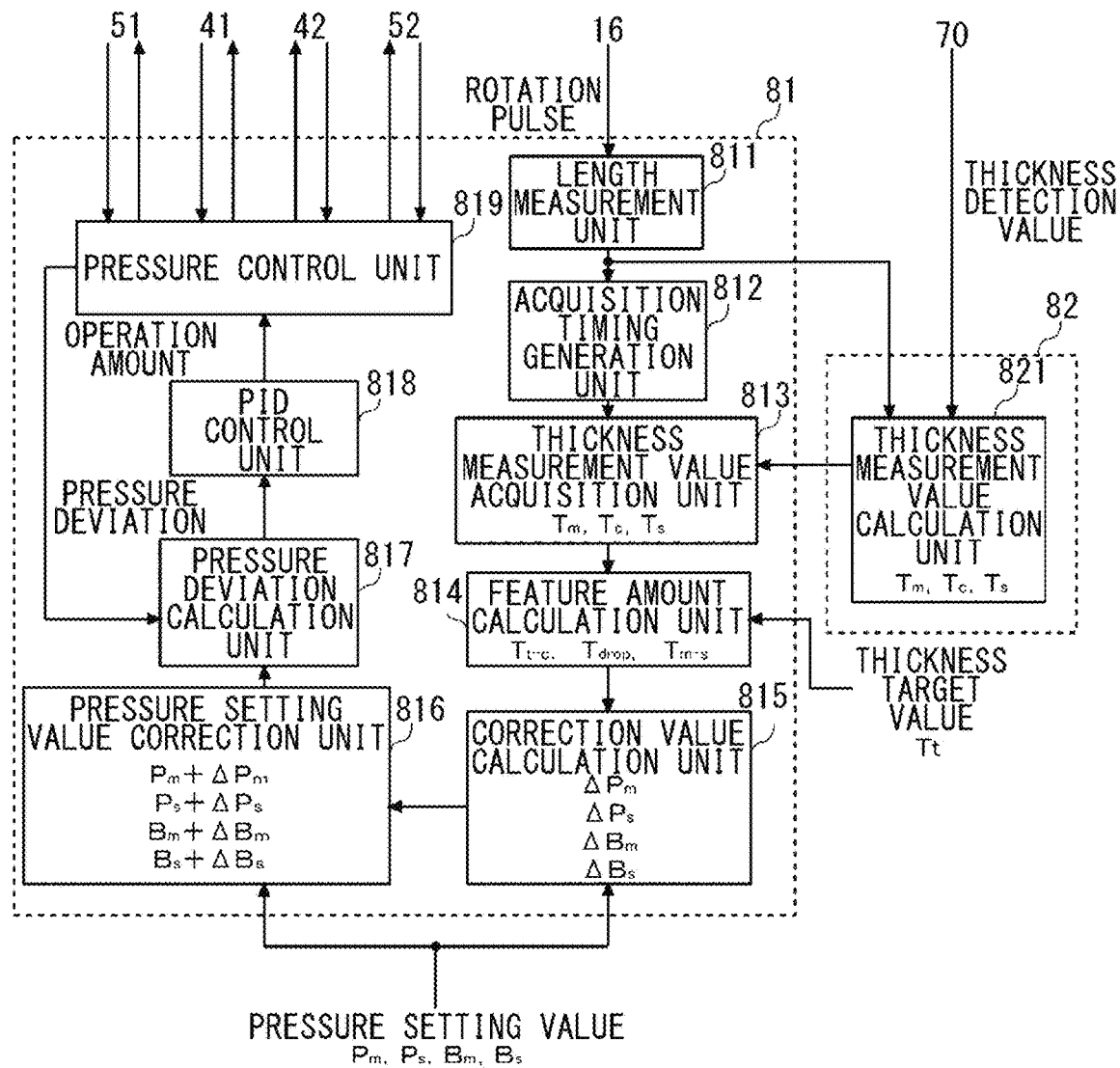
FIG. 3 is a diagram showing a configuration example of a first control panel and a second control panel of FIG. 2.

FIG. 3 is a diagram showing a configuration example of the first control panel 81 and the second control panel 82 of FIG. 2. The first control panel 81 includes a programmable logic controller (PLC), a personal computer (PC), a human machine interface (HMI), an actuator controller, and the like. The second control panel includes a PLC, a PC, a sensor controller, and the like.

A program running in the PLC is generated by a dedicated application in the PC and downloaded to the PLC. Further, the product information on the electrode plate 2 is input to the PLC from a manufacturing execution system (MES). Further, various setting values input to the operator via the HMI are input to the PLC. The setting values include a thickness target value of the electrode plate 2, a pressure setting value of the press mechanism, and a pressure setting value of the bend mechanism. The HMI receives operator's input, displays the driving status, alerts, etc., and outputs sound.

FIG. 3 depicts a functional block realized by the first control panel 81 and the second control panel 82. The first control panel 81 includes a length measurement unit 811, an acquisition timing generation unit 812, a thickness measurement value acquisition unit 813, a feature amount calculation unit 814, a correction value calculation unit 815, a pressure setting value correction unit 816, a pressure deviation calculation unit 817, a PID control unit 818, and a pressure control unit 819. The second control panel 82 includes a thickness measurement value calculation unit 821.

A rotation pulse is input from the pulse generator 16 to the length measurement unit 811. The length measurement unit 811 estimates the rotation speed of the first pressure roller 11 and the rotation speed of the second pressure roller 12 based on the input rotation pulse so as to estimate the speed of the electrode plate 2 passing between the first pressure roller 11 and the second pressure roller 12. The length measurement unit 811 measures the length (distance) advanced by the electrode plate 2 per unit time based on the estimated speed of the electrode plate 2. The length measurement unit 811 supplies the measured length of the electrode plate 2 to the acquisition timing generation unit 812 and the thickness measurement value calculation unit 821.

To the thickness measurement value calculation unit 821, the respective thickness detection values on the driving side, at the central part, and on the operating side are input from the thickness meter 70. Further, the length of the electrode plate 2 is input from the length measurement unit 811.

When three thickness detection sensors are fixed to detect the thickness in the thickness meter 70, the thickness measurement value calculation unit 821 averages and filters each of the three thickness detection values in the length direction (traveling direction) of the electrode plate 2 in order to eliminate high-period thickness variations that do not need to be controlled. In order to eliminate abrupt changes in the traveling direction due to the pulsation of a coating pump in a coating process or the like, an average value of 5 mm or more in the traveling direction is desirably calculated.

For example, when a thickness detection value is input for every 1 mm pitch, the thickness measurement value calculation unit 821 calculates a moving average value for five points in the traveling direction and uses the moving average value as the measurement value. Alternatively, the thickness measurement value calculation unit 821 may calculate an average value for three points out of five points detected in the traveling direction after excluding two points that are off the most and use the average value as the measurement value. When calculating the moving average value, the thickness measurement value calculation unit 821 uses the length of the electrode plate 2 input from the length measurement unit 811 as a synchronization signal. Detection values for an uncoated part corresponding to a slit in the width direction of the electrode plate 2 and a part coated on only one side are removed.

When the thickness meter 70 scans one thickness detection sensor in the width direction of the electrode plate 2 so as to detect the thickness, the thickness measurement value calculation unit 821 may calculate the average value of the respective detection values in a width range on the driving side, at the central part, and on the operating side that are set in advance and use the average value as the measurement value. Further, the measurement value may be averaged in the traveling direction as described above to be used as the final measurement value.

The thickness measurement value calculation unit 821 supplies a driving side thickness measurement value $T_m$, a center thickness measurement value $T_c$, and an operating side thickness measurement value $T_s$ that have been calculated to the thickness measurement value acquisition unit 813.

The acquisition timing generation unit 812 generates timing for the thickness measurement value acquisition unit 813 to acquire the driving side thickness measurement value $T_m$, the center thickness measurement value $T_c$, and the operating side thickness measurement value $T_s$ that are supplied from the thickness measurement value calculation unit 821 and then supplies the generated timing to the thickness measurement value acquisition unit 813.

There is a distance $L_t$ (pass line length $L_t$) between a press position according to the first pressure roller 11 and the second pressure roller 12 and the thickness meter 70. Therefore, there is a time lag until the thickness change caused by the pressure change by the first pressure roller 11 and the second pressure roller 12 is detected by the thickness meter 70. Further, a time lag $t_d$ occurs from the change of the pressure setting value of the press mechanism and/or the bend mechanism to the completion of the actual pressure change of the press mechanism and/or the bend mechanism. When hydraulic cylinders are used for the first press cylinder 41a, the second press cylinder 42a, the first bend cylinder, and the second bend cylinder, the time lag $t_d$ until the actual pressure is changed is smaller than that in the first electric screw-down device 41b and the second electric screw-down device 42b.

The pass line length $L_t$ and the control system time lag $t_d$ are measured in advance, and the measured values are set as fixed values in the acquisition timing generation unit 812. The acquisition timing generation unit 812 uses a length parameter L to be compared with the pass line length $L_t$ and a time parameter t to be compared with the control system time lag $t_d$. The acquisition timing generation unit 812 increments the length parameter L based on the length of the electrode plate 2 supplied from the length measurement unit 811 and increments the control system time lag $t_d$ based on a clock signal supplied from a clock (not shown).

When the pressure setting value of at least one of the first press mechanism 41, the second press mechanism 42, the first bend mechanism 51, and the second bend mechanism 52 is changed by the pressure setting value correction unit 816, the acquisition timing generation unit 812 resets the length parameter L and the time parameter t to zero. When the length parameter L exceeds the pass line length $L_t$ and the time parameter t exceeds the control system time lag $t_d$, the acquisition timing generation unit 812 supplies acquisition timing to the thickness measurement value acquisition unit 813.

A state where the length parameter L exceeds the pass line length $L_t$ and the time parameter t exceeds the control system time lag $t_d$ is a state where the thickness change of the electrode plate 2 due to the change of the pressure setting value of the press mechanism and/or the bend mechanism is reflected in the detection value from the thickness meter 70. On the other hand, a state where the length parameter L does not exceed the pass line length $L_t$ or the time parameter t does not exceed the control system time lag $t_d$ is a state where the thickness change of the electrode plate 2 due to the change of the pressure setting value of the press mechanism and/or the bend mechanism is not yet reflected in the detection value from the thickness meter 70.

This is a state where the influence of the change in the pressure setting value on the thickness of the electrode plate 2 has not been confirmed. Therefore, it is necessary to wait until the length parameter L exceeds the pass line length $L_t$ and the time parameter t exceeds the control system time lag $t_d$, and the next change in the pressure setting value is suspended until that state is achieved. This avoids unnecessary or excessive changes in the pressure setting value of the press mechanism and/or the bend mechanism and allows for efficient adjustment of the pressure setting value.

The thickness measurement value acquisition unit 813 acquires the driving side thickness measurement value $T_m$, the center thickness measurement value $T_c$, and the operating side thickness measurement value $T_s$ supplied from the thickness measurement value calculation unit 821 at a time when the values are supplied from the acquisition timing generation unit 812 and supplies the values to the feature amount calculation unit 814.

The driving side thickness measurement value $T_m$, the center thickness measurement value $T_c$, and the operating side thickness measurement value $T_s$ are input to the feature amount calculation unit 814 from the thickness measurement value acquisition unit 813. Further, a thickness target value $T_t$ set by the operator is input to the feature amount calculation unit 814.

The feature amount calculation unit 814 calculates three deviation feature amounts defined by the following (Equation 1) to (Equation 3) as the thickness feature amounts to be controlled based on the driving side thickness measurement value $T_m$, the center thickness measurement value $T_c$, the operating side thickness measurement value $T_s$, and the thickness target value $T_t$. A first feature amount $T_{t-c}$ is defined by the difference between the thickness target value $T_t$ and the center thickness measurement value $T_c$. A second feature amount $T_{drop}$ is defined by the difference between the center thickness measurement value $T_c$ and the average value of the driving side thickness measurement value $T_m$ and the operating side thickness measurement value $T_s$. That is, the second feature amount $T_{drop}$ is defined by the sum of a value obtained by subtracting the driving side thickness measurement value $T_m$ from the center thickness measurement value $T_c$ and a value obtained by subtracting the operating side thickness measurement value $T_s$ from the center thickness measurement value $T_c$. A third feature amount $T_{m-s}$ is defined by the difference between the driving side thickness measurement value $T_m$ and the operating side thickness measurement value $T_s$.

$$T_{t-c} = T_t - T_c \quad \text{(Equation 1)}$$

$$T_{drop} = (T_c - T_m) + (T_c - T_s) \quad \text{(Equation 2)}$$

$$T_{m-s} = T_m - T_s \quad \text{(Equation 3)}$$

When the first feature amount $T_{t-c}$ is equal to 0, the second feature amount $T_{drop}$ is equal to 0, and the third feature amount $T_{m-s}$ is equal to 0, the driving side thickness measurement value $T_m$ is equal to the thickness target value $T_t$, the center thickness measurement value $T_c$ is equal to the thickness target value $T_t$, and the operating side measurement value $T_s$ is equal to the target thickness value $T_t$. The second feature amount $T_{drop}$ represents a quadratic component of the thickness profile (an upwardly convex parabolic shape when the numerical value is large). The third feature amount $T_{m-s}$ represents a linear component of the thickness profile (linear inclination). The second feature amount $T_{drop}$ being equal to 0 and the third feature amount $T_{m-s}$ being equal to 0 mean that the thickness of the electrode plate 2 is flat in the width direction.

The feature amount calculation unit 814 supplies the calculated first feature amount $T_{t-c}$, the second feature amount $T_{drop}$, and the third feature amount $T_{m-s}$ to the correction value calculation unit 815.

According to the experiments by the present inventors, it was found that there were relationships defined by the following (Equation 4) to (Equation 6) between the first feature amount $T_{t-c}$, the second feature amount $T_{drop}$, and the third feature amount $T_{m-s}$ and loads.

$$T_{t-c} \propto \text{(total load)} = \text{(total press load)} - \text{(total bend load)} - \text{(total preload)} \quad \text{(Equation 4)}$$

$$T_{drop} \propto A \times \text{(total press load)} - B \times \text{(total bend load)} - C \times \text{(total preload)} \quad \text{(Equation 5)}$$

$$T_{m-s} \propto D \times \{\text{(operating side press load)} - \text{(driving side press load)}\} - E \times \{\text{(operating side bend load)} - \text{(driving side bend load)}\} - F \times \{\text{(operating side preload)} - \text{(driving side preload)}\} \quad \text{(Equation 6)}$$

The total press load is the sum of the driving side press load and the operating side press load, the total bend load is the sum of the driving side bend load and the operating side bend load, and the total preload is the sum of the driving side preload and the operating side preload. The driving side load is a driving side load generated by a driving side press cylinder, a driving side bend cylinder, and a driving side preload cylinder. The operating side load is an operating side load generated by an operating side press cylinder, an operating side bend cylinder, and an operating side preload cylinder.

The press cylinder load works in the direction of applying pressure to a material to be rolled, and the bend load and the preload work in the direction of lowering the pressure on the material to be rolled. The preload cylinder load is set to a fixed value at which a pressure that does not cause excessive roll deflection and a pressing pressure that can reduce rattling and vibration of the equipment are secured. That is, the preload is not changed in the thickness control. When the preload cylinder load is excessively large, it becomes difficult to control the roll deflection within the control range of the press pressure and the bend pressure.

A, B, and C in the above (Equation 5) are positive constants, which means that the influences of the total press load, the total bend load, and the total preload on the second feature amount $T_{drop}$ are different from one another. D, E, and F in the above (Equation 6) are positive constants, which means that the influences of the press load difference between the driving side and the operating side (hereinafter, simply referred to as press load difference), the bend load difference between the driving side and the operating side (hereinafter, simply referred to as bend load difference), and the preload difference between the driving side and the operating side (hereinafter, simply referred to as preload difference) on the third feature amount $T_{m-s}$ are different from one another.

By measuring the respective proportionality constants of the left side and the right side of each of the above (Equation 4) to (Equation 6) in advance, when the total preload has a constant value, the total press load and the total bend load that make the first feature amount $T_{t-c}$ and the second feature amount $T_{drop}$ zero at the same time can be uniquely obtained from the above (Equation 4) and (Equation 5).

From the above (Equation 6), a press load difference and a bend load difference at which the third feature amount $T_{m-s}$ becomes zero can be calculated. By making the press load difference to be equal to 0, the bend load difference to be equal to 0, or the ratio of the press load difference to the bend load difference to be constant, the press load difference and the bend load difference can be uniquely obtained.

From the total press load, the total bend load, the press load difference, and the bend load difference obtained as described above, a driving side press load, an operating side press load, a driving side bend load, and an operating side bend load can be uniquely obtained that make all the first feature amount $T_{t-c}$, the second feature amount $T_{drop}$, and the third feature amount $T_{m-s}$ to be zero. By controlling the first press mechanism 41 and/or the second press mechanism 42 such that the obtained driving side press load and operating side press load are achieved and controlling the first bend mechanism 51 and/or the second bend mechanism 52 such that the obtained driving side bend load and operating side bend load are achieved, the first feature amount $T_{t-c}$, the second feature amount $T_{drop}$, and the third feature amount $T_{m-s}$ can be controlled to be zero at the same time, and the thickness of the electrode plate 2 over the entire width can be controlled to be the target value $T_t$.

In the present embodiment, each load is controlled by controlling the pressure of each cylinder. The load is calculated by multiplying the cylinder diameter (constant) by the cylinder pressure. Based on the above (Equation 4) to (Equation 6), the following relationships (Equation 7) to (Equation 15) are established between an average press pressure $P_{ave}$, an average bend pressure $B_{ave}$, an average payload pressure $R_{ave}$, a press pressure difference $P_{s-m}$, a bend pressure difference $B_{s-m}$, and a payload pressure difference $R_{s-m}$ and the first feature amount $T_{t-c}$, the second feature amount $T_{drop}$, and the third feature amount $T_{m-s}$. More specifically, the following (Equation 7) to (Equation 9) are derived from the above (Equation 4), (Equation 10) to (Equation 12) are derived from the above (Equation 5), and the following (Equation 13) to (Equation 15) are derived from the above (Equation 6).

$$T_{t-c} \propto -P_{ave} \quad \text{(Equation 7)}$$

$$T_{t-c} \propto -B_{ave} \quad \text{(Equation 8)}$$

$$T_t \propto -R_{ave} \quad \text{(Equation 9)}$$

$$T_{drop} \propto -R_{ave} \quad \text{(Equation 10)}$$

$$T_{drop} \propto -B_{ave} \quad \text{(Equation 11)}$$

$$T_{drop} \propto -R_{ave} \quad \text{(Equation 12)}$$

$$T_{m-s} \propto P_{s-m} \quad \text{(Equation 13)}$$

$$T_{m-s} \propto -B_{s-m} \quad \text{(Equation 14)}$$

$$T_{m-s} \propto -R_{s-m} \quad \text{(Equation 15)}$$

The average press pressure $P_{ave}$, the average bend pressure $B_{ave}$, the average payload pressure $R_{ave}$, the press pressure difference $P_{s-m}$, the bend pressure difference $B_{s-m}$, and the payload pressure difference $R_{s-m}$ are defined by the following (Equation 16) to (Equation 21) based on a driving side press pressure $P_m$, an operating side press pressure $P_s$, a driving side bend pressure $B_m$, an operating side bend pressure $B_s$, a driving side payload pressure $R_m$, and an operating side payload pressure $R_s$.

$$P_{ave}=(P_m+P_s)/2 \qquad \text{(Equation 16)}$$

$$B_{ave}=(B_m+B_s)/2 \qquad \text{(Equation 17)}$$

$$R_{ave}=(R_m+R_s)/2 \qquad \text{(Equation 18)}$$

$$P_{s-m}=P_s-P_m \qquad \text{(Equation 19)}$$

$$B_{s-m}=B_s-B_m \qquad \text{(Equation 20)}$$

$$R_{s-m}=R_s-R_m \qquad \text{(Equation 21)}$$

The respective proportionality constants of the above (Equation 7) to (Equation 8), the above (Equation 10) to (Equation 11), and the above (Equation 13) to (Equation 14) are measured in advance. When the payload pressure is constant, the average press pressure $P_{ave}$ and the average bend pressure $B_{ave}$ at which the first feature amount $T_{t-c}$ and the second feature amount $T_{drop}$ become zero at the same time are uniquely obtained from the correlation shown in the above (Equation 7) to (Equation 8) and the above (Equation 10) to (Equation 11). From the correlation of the above (Equation 13) to (Equation 14), the press pressure difference $P_{s-m}$ and the bend pressure difference $B_{s-m}$ at which the third feature amount $T_{m-s}$ becomes zero are obtained. However, in order to uniquely obtain the press pressure difference $P_{s-m}$ and the bend pressure difference $B_{s-m}$, either the press pressure difference $P_{s-m}$ or the bend pressure difference $B_{s-m}$ needs to have a fixed value, or the ratio of the press pressure difference $P_{s-m}$ to the bend pressure difference $B_{s-m}$ needs to have a fixed value.

A driving side press pressure correction value $\Delta P_m$, an operating side press pressure correction value $\Delta P_s$, a driving side bend pressure correction value $\Delta B_m$, and an operating side bend pressure correction value $\Delta B_s$ are also uniquely obtained that are necessary for the average press pressure $P_{ave}$, the average bend pressure $B_{ave}$, the press pressure difference $P_{s-m}$, and the bend pressure difference $B_{s-m}$ obtained as described above to match the average press pressure $P_{ave}$, the average bend pressure $B_{ave}$, the press pressure difference $P_{s-m}$, and the bend pressure difference $B_{s-m}$ calculated from a driving side press pressure setting value $P_m$, an operating side press pressure setting value $P_s$, a driving side bend pressure setting value $B_m$, and an operating side bend pressure setting value $B_s$ set by the operator.

By setting the pressure of the first press mechanism 41 to a corrected driving side press pressure setting value $P_m+\Delta P_m$, the pressure of the second press mechanism 42 to a corrected operating side press pressure setting value $P_s+\Delta P_s$, the pressure of the first bend mechanism 51 to a corrected driving side bend pressure setting value $B_m+\Delta B_m$, and the pressure of the second bend mechanism 52 to a corrected operating side bend pressure setting value $B_s+\Delta B_s$ and controlling the pressure of each of the mechanisms, the thickness of the electrode plate 2 over the entire width can be controlled to the target value $T_t$.

The first feature amount $T_{t-c}$, the second feature amount $T_{drop}$, and the third feature amount $T_{m-s}$ are supplied to the correction value calculation unit 815 from the feature amount calculation unit 814. Further, the driving side press pressure setting value $P_m$, the operating side press pressure setting value $P_s$, the driving side bend pressure setting value $B_m$, and the operating side bend pressure setting value $B_s$ input by the operator via the HMI are supplied.

The correction value calculation unit 815 calculates the driving side press pressure correction value $\Delta P_m$, the operating side press pressure correction value $\Delta P_s$, the driving side bend pressure correction value $\Delta B_m$, and the operating side bend pressure correction value $\Delta B_s$ based on the first feature amount $T_{t-c}$, the second feature amount $T_{drop}$, the third feature amount $T_{m-s}$, the average press pressure $P_{ave}$, the average bend pressure $B_{ave}$, the press pressure difference $P_{s-m}$, and the bend pressure difference $B_{s-m}$ and the proportionality constants of (Equation 7), (Equation 8), (Equation 10), (Equation 11), (Equation 13), and (Equation 14) above. The correction value calculation unit 815 supplies the calculated driving side press pressure correction value $\Delta P_m$, operating side press pressure correction value $\Delta P_s$, driving side bend pressure correction value $\Delta B_m$, and operating side bend pressure correction value $\Delta B_s$ to the pressure setting value correction unit 816.

The driving side press pressure correction value $\Delta P_m$, the operating side press pressure correction value $\Delta P_s$, the driving side bend pressure correction value $\Delta B_m$, and the operating side bend pressure correction value $\Delta B_s$ are supplied to the pressure setting value correction unit 816 from the correction value calculation unit 815. Further, the driving side press pressure setting value $P_m$, the operating side press pressure setting value $P_s$, the driving side bend pressure setting value $B_m$, and the operating side bend pressure setting value $B_s$ input by the operator via the HMI are supplied.

The pressure setting value correction unit 816 adds the driving side press pressure correction value $\Delta P_m$, the operating side press pressure correction value $\Delta P_s$, the driving side bend pressure correction value $\Delta B_m$, and the operating side bend pressure correction value $\Delta B_s$ to the driving side press pressure setting value $P_m$, the operating side press pressure setting value $P_s$, the driving side bend pressure setting value $B_m$, and the operating side bend pressure setting value $B_s$, respectively, so as to calculate the corrected driving side press pressure setting value $P_m+\Delta P_m$, the corrected operating side press pressure setting value $P_s+\Delta P_s$, the corrected driving side bend pressure setting value $B_m+\Delta B_m$, and the corrected operating side bend pressure setting value $B_s+\Delta B_s$.

The pressure setting value correction unit 816 supplies the corrected driving side press pressure setting value $P_m+\Delta P_m$, the corrected operating side press pressure setting value $P_s+\Delta P_s$, the corrected driving side bend pressure setting value $B_m+\Delta B_m$, and the corrected operating side bend pressure setting value $B_s+\Delta B_s$ that have been calculated to the pressure deviation calculation unit 817.

The pressure deviation calculation unit 817 calculates respective deviations between the corrected driving side press pressure setting value $P_m+\Delta P_m$, the corrected operating side press pressure setting value $P_s+\Delta P_s$, the corrected driving side bend pressure setting value $B_m+\Delta B_m$, and the corrected operating side bend pressure setting value $B_s+\Delta B_s$ supplied from the pressure setting value correction unit 816 and the measured pressure value of the first press mechanism 41, the measured pressure value of the second press mechanism 42, the measured pressure value of the first bend mechanism 51, and the measured pressure value of the second bend mechanism 52 supplied from the pressure control unit 819.

The pressure control unit 819 includes an actuator controller, controls the pressure of each cylinder and the pressure of each electric reduction device electric screw-down device, and acquires the pressure actually being applied by each cylinder to each bearing unit and the pressure actually being applied by each electric screw-down device to each bearing unit. For example, in a case of a hydraulic cylinder, the pressure actually being applied by the hydraulic cylinder is measured based on the valve opening measured by a valve opening meter.

The pressure deviation calculation unit 817 supplies the pressure deviation of the first press mechanism 41, the pressure deviation of the second press mechanism 42, the pressure deviation of the first bend mechanism 51, and the pressure deviation of the second bend mechanism 52 that have been calculated to the PID control unit 818. The PID control unit 818 generates the operation amount of the mechanism 41, the operation amount of the second press mechanism 42, the operation amount of the first bend mechanism 51, and the operation amount of the second bend mechanism 52 based on the pressure deviation of the first press mechanism 41, the pressure deviation of the second press mechanism 42, the pressure deviation of the first bend mechanism 51, and the pressure deviation of the second bend mechanism 52.

Instead of PID compensation, P compensation, PI compensation, or PD compensation may be used. A proportional term (steady state deviation) can be controlled in P compensation, an integral term can be controlled in I compensation, and a derivative term can be controlled in D compensation.

The PID control unit 818 supplies the operation amount of the first press mechanism 41, the operation amount of the second press mechanism 42, the operation amount of the first bend mechanism 51, and the operation amount of the second bend mechanism 52 that have been generated to the pressure control unit 819. The pressure control unit 819 drives the first press mechanism 41, the second press mechanism 42, the first bend mechanism 51, and the second bend mechanism 52 based on the operation amount of the first press mechanism 41, the operation amount of the second press mechanism 42, the operation amount of the first bend mechanism 51, and the operation amount of the second bend mechanism 52, respectively.

Figure 4A:
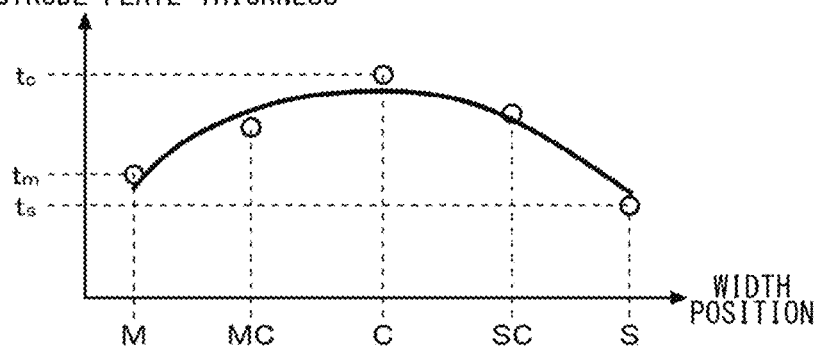
FIGS. 4A-4C are diagrams for verification performed on the validity of a first feature amount $T_{t-c}$, a second feature amount $T_{drop}$, and a third feature amount $T_{m-s}$.
Figure 4B:
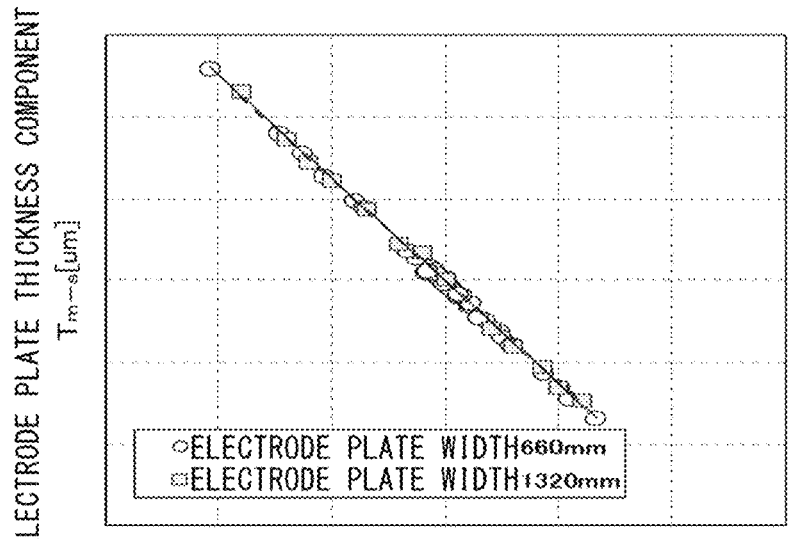
Figure 4C:
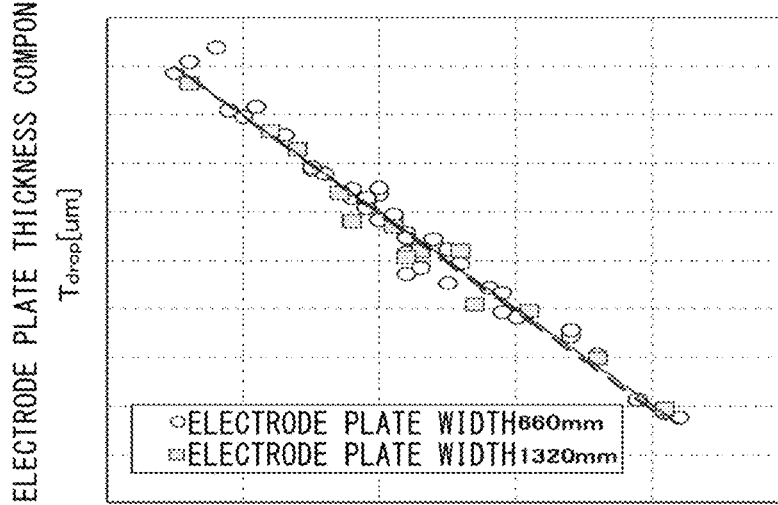

FIGS. 4A to 4C are diagrams for verification performed on the validity of the first feature amount $T_{t-c}$, the second feature amount $T_{drop}$, and the third feature amount $T_{m-s}$. FIG. 4A is a diagram showing a quadratic curve in which the measured values of the electrode plate thickness of a certain electrode plate 2 at five points in the width direction are fitted by the least squares method.

FIG. 4B is a diagram comparing the linear component of the quadratic function obtained by fitting the measured values of the electrode plate thicknesses of the electrode plate 2 at five points in the width direction by the least squares method shown in FIG. 4A with the third feature amount $T_{m-s}$ that is based on the measured electrode plate thickness value $T_m$ on the driving side M and the measured electrode plate thickness value $T_s$ on the operating side S. The coefficient of determination R is nearly equal to 1, and it can be found that the two are in a substantially proportional relationship.

FIG. 4C is a diagram comparing the quadratic component of the quadratic function obtained by fitting the measured values of the electrode plate thicknesses of the electrode plate 2 at five points in the width direction by the least squares method shown in FIG. 4A with the second feature amount $T_{drop}$ that is based on the respective measured electrode plate thickness values $T_m$, $T_c$, and $T_s$ at three points: on the driving side M; at the center C; and on the operating side S. The coefficient of determination R is nearly equal to 1, and it can be found that the two are in a substantially proportional relationship.

In this way, it is found that from the feature amounts based on the respective measured electrode plate thickness values $T_m$, $T_c$, and $T_s$ at three points: on the driving side M; at the center C; and on the operating side S, the accuracy of estimating the electrode plate thickness can be obtained that is equivalent to that of the quadratic function obtained by fitting the measured values of the electrode plate thicknesses at five points.

Figure 5A:
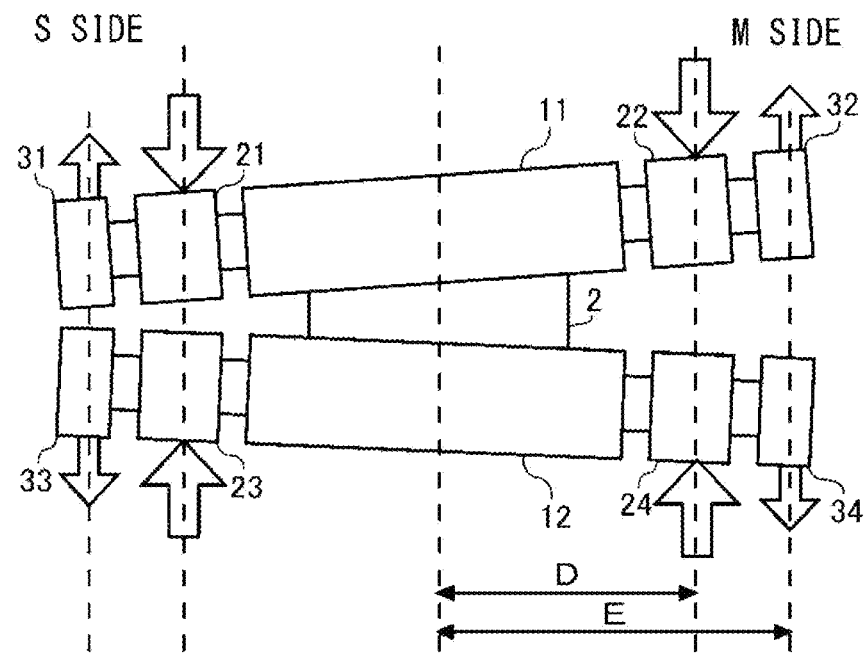
FIGS. 5A and 5B are diagrams schematically showing a load moment component acting on the thickness profile of an electrode plate.
Figure 5B:
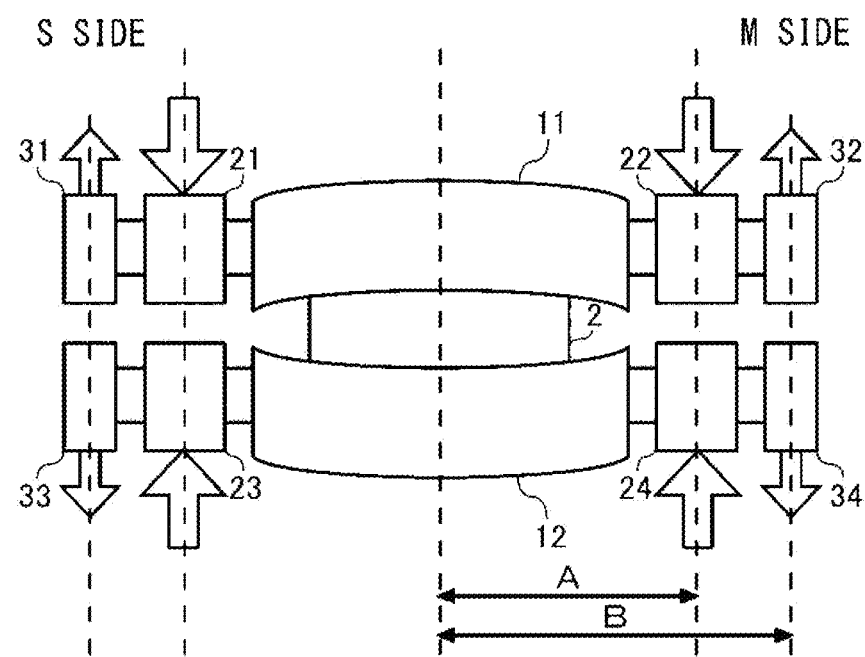

FIGS. 5A to 5B are diagrams schematically showing a load moment component acting on the thickness profile of the electrode plate 2. In FIGS. 5A to 5B, the preload is not taken into consideration. FIG. 5A is a diagram schematically showing a load moment component acting on the third feature amount $T_{m-s}$ (linear component (slope)). The load moment component is defined by $D \times (P_s - P_m) - E \times (B_s - B_m)$ as shown in the above (Equation 6).

FIG. 5B is a diagram schematically showing a load moment component acting on the second feature amount $T_{drop}$ (quadratic component (deflection)). The load moment component is defined by $A \times (P_s + P_m) - B \times (B_s - B_m)$ as shown in the above (Equation 5).

As explained above, according to the present embodiment, the first feature amount $T_{t-c}$, the second feature amount $T_{drop}$, and the third feature amount $T_{m-s}$ are calculated based on the driving side thickness measurement value $T_m$, the center thickness measurement value $T_c$, the operating side thickness measurement value $T_s$, and the thickness target value $T_t$, and the press mechanism and/or the bend mechanism are controlled such that the first feature amount $T_{t-c}$, the second feature amount $T_{drop}$, and the third feature amount $T_{m-s}$ all become zero. As a result, the thickness of the electrode plate 2 after compression process can be converged to the target value $T_t$ over the entire width.

Patent Document 1 (Japanese Patent Application Publication No. 2013-111647) discloses a method of measuring the thickness after compression at three parts: on the operating side, at the central part, and on the driving side, and controlling, when the differences between the respective thickness measurement values and the target thickness fall outside a preset threshold value, the press mechanism and the bend mechanism such that, the differences fall within the threshold value. In this method, since film thickness control is not activated until the threshold value is exceeded, it is not possible to obtain the accuracy of thickness having the threshold value or higher, and it may take time for the thickness to converge near the target thickness or it may not be possible for the thickness to converge near the thickness.

Further, in the above method, the driving side thickness, the operating side thickness, and the target thickness are compared, and when the threshold value is exceeded, the position of the press cylinder is reset so as to correct this, and the pressure of the bend cylinder is calculated and set in order to maintain the deflection correction amount that changes due to the position change of the press cylinder. When the threshold is not exceeded, the central part thickness is compared with the threshold value, and when the threshold is exceeded, only the pressure of the bend cylinder is changed on the assumption that the roll deformation of the central part is large, and the position of the press cylinder is not changed. These control flows are repeatedly executed.

In general, since the pressure change of the bend cylinder acts in the direction of opening the roll gap and changes the rolling load on the material to be rolled, the thickness changes. Therefore, in any of the procedures in the above control flow, the film thickness changes by changing the pressure of the bend cylinder, and the threshold value is exceeded again. Thus, there is a situation where it takes time to reach the target thickness or where the thickness cannot be controlled at the threshold value. In particular, the narrower the threshold value becomes, or the more the position of the press cylinder or the pressure of the bend cylinder needs to be changed, the more likely the threshold value is exceeded again. Therefore, there is a limit to the controllable thickness range and control speed.

On the other hand, according to the present embodiment, the thickness of the electrode plate 2 is always maintained to be in a good state by feedback control performed such that the thickness of the electrode plate 2 after the compression process is always converged to the target value $T_t$. Further, since the thickness of the electrode plate 2 is automatically controlled to the target value $T_t$, there is no need for the operator to periodically stop the line, measure the thickness of the electrode plate 2 with a micrometer, and adjust the pressure value of the press mechanism and/or the bend mechanism based on the measured value. Therefore, it is not necessary to allocate skilled operators, and labor costs can thus be suppressed. In addition, it is possible to suppress variations in quality depending on the operator.

Further, in the present embodiment, in order to prevent new pressure correction from being performed based on thickness measurement values obtained before pressure correction is reflected, thickness measurement values are acquired after time $t_d$ has passed that takes until the length of the electrode plate 2 reaches the pass line length $L_t$ from the press position to the thickness meter 70 and the change in the pressure setting values is reflected in the actual pressure result after pressure correction is performed. Three feature amounts are calculated based on the acquired thickness measurement values, pressure correction values are calculated based on the three feature amounts, and the next pressure change is performed.

In a coating process and a drying process, which are pre-pressing processes, the thickness of the material to be rolled after pressing may change due to changes in the coating film thickness and coating film hardness of the material to be rolled or due to the thermal influence of the pressure rolls and the spindle box of the press machine. Even in that case, by repeating and continuously performing the above control, the thickness of the material to be rolled after pressing can be controlled to be at the target value $T_t$ in the entire width immediately after the thickness meter 70 detects the thickness change, and a favorable thickness can be obtained over the entire length.

Since the above-mentioned proportionality constant varies depending on the type of material to be rolled, the proportionality constant is desirably measured for each type.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

In FIG. 3, an example is described in which the control device 80 is formed by two control panels, the first control panel 81 and the second control panel 82. Alternatively, the control device 80 may be formed by a single control panel in which the first control panel 81 and the second control panel 82 are integrated.

Further, in the above-described embodiment, an example is described in which the press mechanism and/or the bend mechanism are controlled in such a manner that the first feature amount $T_{t-c}$, the second feature amount $T_{drop}$, and the third feature amount $T_{m-s}$ are all zero. A state where both the second feature amount $T_{drop}$ and the third feature amount $T_{m-s}$ are zero is a state where the electrode plate 2 is flat in the width direction. In this respect, in the case of manufacturing an electrode plate 2 both of whose edges are thicker than the center, the press mechanism and/or the bend mechanism is controlled such that the second feature amount $T_{drop}$ has a negative value according to the thickness difference between the edges and the center. Further, in the case of manufacturing an electrode plate both of whose edges are thinner than the center, the press mechanism and/or the bend mechanism is controlled such that the second feature amount $T_{drop}$ has a positive value according to the thickness difference between the edges and the center.

That is, an electrode plate 2 having an arbitrary thickness profile can be manufactured by arbitrarily setting α, β, and γ in the following (Equation 22) to (Equation 24).

$$T_{t-c}+\alpha=0 \quad \text{(Equation 22)}$$

$$T_{drop}+\beta=0 \quad \text{(Equation 23)}$$

$$T_{m-s}+\gamma=0 \quad \text{(Equation 24)}$$

where α, β, and γ are arbitrary real numbers [μm].

In the above-described embodiment, the second feature amount indicating the quadratic component of the thickness profile of the electrode plate is defined by the difference between the center thickness measurement value $T_c$ and the average value of the driving side thickness measurement value $T_m$ and the operating side thickness measurement value $T_s$. The third feature amount indicating the linear component of the thickness profile of the electrode plate is defined by the difference between the driving side thickness measurement value $T_m$ and the operating side thickness measurement value $T_s$. In this respect, the second feature amount and the third feature amount can be defined from a quadratic or quaternary approximation curve derived by using the least squares method.

Figure 6A:
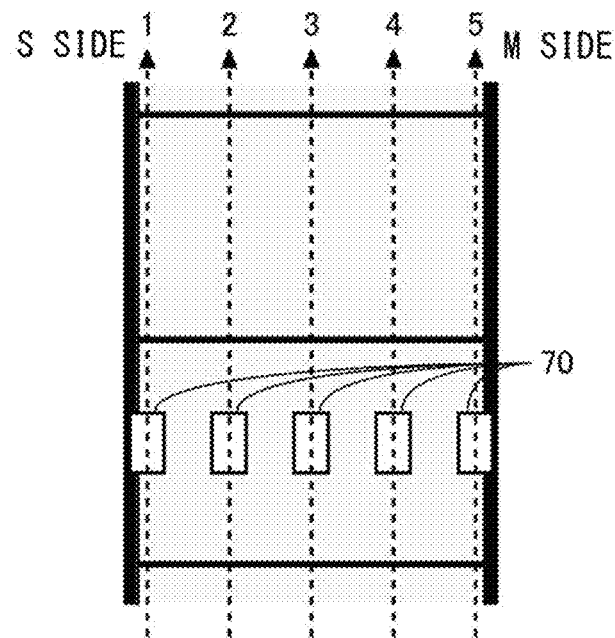
FIGS. 6A and 6B are diagrams for explaining an example of a method for deriving a second feature amount and a third feature amount according to an exemplary variation.
Figure 6B:
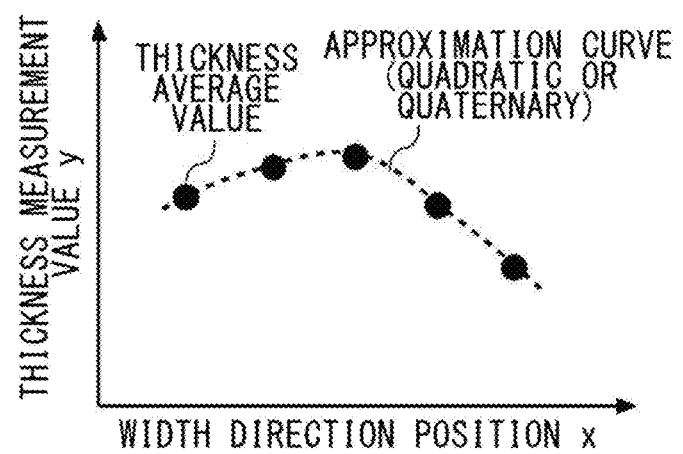

FIGS. 6A and 6B are diagrams for explaining an example of a method for deriving a second feature amount and a third feature amount according to an exemplary variation. FIG. 6A is a top view of an electrode plate moving on a pass line. The thick black line indicates a copper foil part. The electrode plate moves on the pass line in a direction from the bottom to the top. In FIG. 6A, a plurality of thickness meters 70 are fixed and arranged side by side in the width direction of the electrode plate 2. More specifically, five thickness meters 70 are installed side by side in the width direction. The thickness measurement value calculation unit 821 calculates five thickness measurement values by averaging five thickness detection values respectively detected by the five thickness meters 70 in the length direction (traveling direction) of the electrode plate. As described above, an average value of 5 mm or more in the traveling direction is desirably calculated.

FIG. 6B is a diagram showing thickness measurement values at five points and an approximation curve derived by the least squares method based on the thickness measurement values at the five points. The feature amount calculation unit 814 approximates a quadratic curve or a quartic curve by the least squares method using the thickness measurement values at five points as sample data. The approximated quadratic curve is defined by the following (Equation 25), and the approximated quartic curve is defined by the following (Equation 26).

$$y = a \cdot x^2 + b \cdot x + c \quad \text{(Equation 25)}$$

$$y = d \cdot x^4 + e \cdot x^3 + f \cdot x^2 + g \cdot x + h \quad \text{(Equation 26)}$$

When approximation is performed by the quadratic curve, the feature amount calculation unit 814 sets a quadratic coefficient a of the approximated quadratic curve as the second feature amount and sets a linear coefficient b as the third feature amount. When approximation is performed by the quartic curve, the feature amount calculation unit 814 sets a quadratic coefficient f of the approximated quartic curve as the second feature amount and sets a linear coefficient g as the third feature amount. To the first feature amount, the difference between the thickness target value $T_t$ and the center thickness measurement value $T_c$ is set in the same manner as described above.

According to the experiments conducted by the present inventors, it was found that there are relationships defined in the following (Equation 27) and (Equation 28) between the second feature amount and the third feature amount and loads in the exemplary variation.

$$a \propto A \times (\text{total press load}) - B \times (\text{total bend load}) - C \times (\text{total preload}) \quad \text{(Equation 27)}$$

$$b \propto D \times \{(\text{operating side press load}) - (\text{driving side press load})\} - E \times \{(\text{operating side bend load}) - (\text{driving side bend load})\} - F \times \{(\text{operating side preload}) - (\text{driving side preload})\} \quad \text{(Equation 28)}$$

In the case of the quartic curve, a is replaced by f, and b is replaced by g.

Figure 7A:
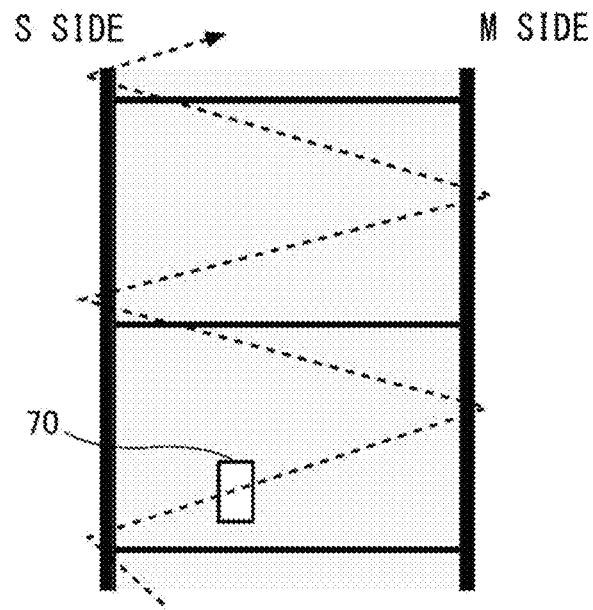
FIGS. 7A and 7B are diagrams for explaining another example of a method for deriving the second feature amount and the third feature amount according to the exemplary variation.
Figure 7B:
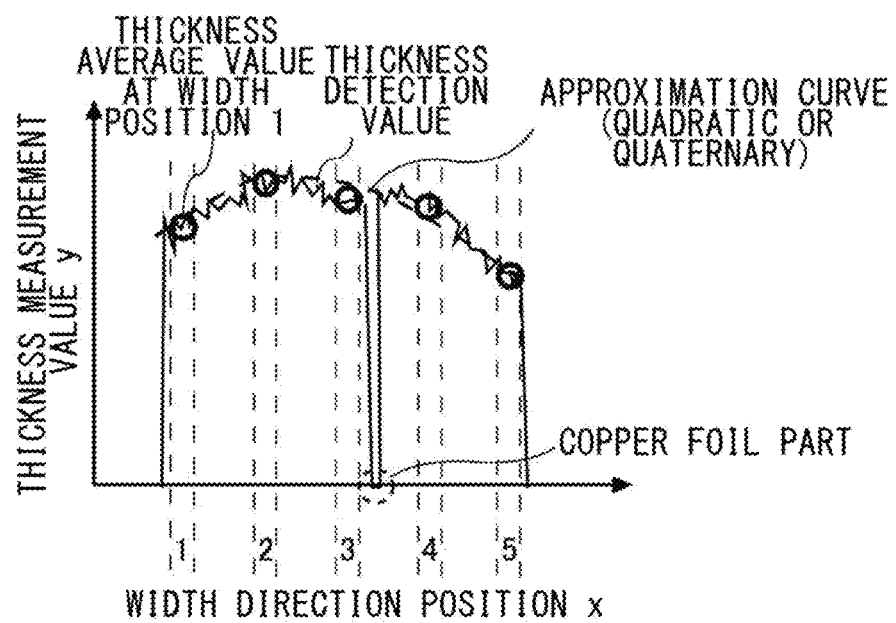

FIGS. 7A and 7B are diagrams for explaining another example of the method for deriving the second feature amount and the third feature amount according to the exemplary variation. An example shown in FIG. 7A is an example in which the electrode plate is scanned by one thickness meter 70 in the width direction so as to continuously detect the thickness of the electrode plate. As shown in FIG. 7B, in the present example, five measurement positions (width positions 1 to 5) are provided in the width direction of the electrode plate. In FIG. 7B, a jagged solid line indicates a thickness detection value, and, for example, detection is performed by a thickness meter 70 at intervals of 2 mm.

The thickness measurement value calculation unit 821 calculates five thickness measurement values by averaging thickness detection values detected in a range of, for example, ±10 mm in the width direction at each width direction position. Detection values at the copper foil part are excluded from the calculation of the average value. In the same way as in the examples shown in FIGS. 6A and 6B, the feature amount calculation unit 814 approximates a quadratic curve or a quartic curve by the least squares method using the thickness measurement values at the five points as sample data. The feature amount calculation unit 814 sets the quadratic coefficient of the approximated quadratic curve or the approximated quartic curve as the second feature amount and sets the linear coefficient as the third feature amount.

In the examples shown in FIGS. 6A, 6B, 7A, and 7C, a quadratic curve or a quartic curve is approximated based on thickness measurement values at five points, the quadratic coefficient of the quadratic curve or the quartic curve is set as the second feature amount, and the linear coefficient is set as the first feature amount. In this respect, the number of sample points needs to be three or more. In general, the larger the number of the sample points, the higher the approximation accuracy. Further, in the case of a quadratic or higher function, the quadratic coefficient and the linear coefficient can be derived.

As described above, according to the exemplary variation, the same effect as that in the example where three feature quantities are calculated by the three-point method shown in the above embodiment is obtained. In the exemplary variation, the accuracy of estimating the thickness of an electrode plate can be further improved by increasing the number of sample points.

The embodiment may be specified by the following items.

[Item 1]

A roll press device (1) comprising:

a first pressure roller (11) and a second pressure roller (12) that sandwich an electrode plate (2) of a secondary battery that is continuously conveyed, thereby rolling the electrode plate (2);

a first main bearing part (21) and a second main bearing part (22) that are provided on one side and the other side of a rotating shaft of the first pressure roller (11), respectively, and that rotatably support the rotating shaft;

a third main bearing part (23) and a fourth main bearing part (24) that are provided on one side and the other side of a rotating shaft of the second pressure roller (12), respectively, and that rotatably support the rotating shaft;

a first bend bearing part (31) and a second bend bearing part (32) that are provided on one side and the other side of a rotating shaft of the first pressure roller (11), respectively, and that rotatably support the rotating shaft;

a third bend bearing part (33) and a fourth bend bearing part (34) that are provided on one side and the other side of a rotating shaft of the second pressure roller (12), respectively, and that rotatably support the rotating shaft;

a first press mechanism (41) that is capable of applying a load to at least one of the first main bearing part (21) and the third main bearing part (23) in a direction in which the first pressure roller (11) and the second pressure roller (12) become close to each other;

a second press mechanism (42) that is capable of applying a load to at least one of the second main bearing part (22) and the fourth main bearing part (24) in a direction in which the first pressure roller (11) and the second pressure roller (12) become close to each other;

a first bend mechanism (51) that is capable of applying a load to the first bend bearing part (31) and the third bend bearing part (33) in a direction in which the first pressure roller (11) and the second pressure roller (12) become separated from or close to each other;

a second bend mechanism (52) that is capable of applying a load to the second bend bearing part (32) and the fourth bend bearing part (34) in a direction in which the first pressure roller (11) and the second pressure roller (12) become separated from or close to each other;

a thickness meter (70) that is provided on the exit side of the first and second pressure rollers (11) and (12) and that detects the thickness of the electrode plate (2) of the secondary battery at three or more points in the width direction of the electrode plate (2);

a calculation unit (814-816) that calculates the respective pressure setting values of the first press mechanism (41), the second press mechanism (42), the first bend mechanism (51), and the second bend mechanism (52) on the basis of thickness measurement values at the three or more points that are based on detection values from the thickness meter (70) and of a thickness target value; and a pressure control unit (819) that controls each load in the first press mechanism (41), the second press mechanism (42), the first bend mechanism (51), and the second bend mechanism (52) based on the pressure setting values calculated by the calculation unit (814-816), wherein the calculation unit (814-816) calculates three feature amounts: the deviation between a thickness measurement value at the central point among the three or more points and the thickness target value, the quadratic component of the thickness profile of the electrode plate (2), and the linear component of the thickness profile of the electrode plate (2), and adaptively changes the respective pressure setting values of the first press mechanism (41), the second press mechanism (42), the first bend mechanism (51), and the second bend mechanism (52) based on the three feature amounts. This allows for the improvement in the accuracy of thickness control on the electrode plate (2) by the roll press device (1).

[Item 2]

The roll press device (1) according to Item 1, wherein the thickness meter (70) is provided on the exit side of the first and second pressure rollers (11) and (12) and detects the thickness of the electrode plate (2) of the secondary battery at a first point, a second point, and a third point arranged in the width direction of the electrode plate (2), the calculation unit (814-816) calculates the respective pressure setting values of the first press mechanism (41), the second press mechanism (42), the first bend mechanism (51), and the second bend mechanism (52) on the basis of a first point thickness measurement value, a second point thickness measurement value, a third point thickness measurement value that are based on detection values from the thickness meter (70) and of the thickness target value, the first point is set at the end of the electrode plate (2) of the secondary battery on the side where the first press mechanism (41) is provided, the second point is set at the center part of the electrode plate (2) of the secondary battery, the third point is set at the end of the electrode plate (2) of the secondary battery on the side where the second press mechanism (42) is provided, and from the first point thickness measurement value, the second point thickness measurement value, the third point thickness measurement value, and the thickness target value, the calculation unit (814-816) calculates three feature amounts: the deviation between the second point thickness measurement value and the thickness target value, the quadratic component of the thickness profile of the electrode plate (2), and the linear component of the thickness profile of the electrode plate (2). This allows for the improvement in the accuracy of thickness control on the electrode plate (2) based on the thickness measurement values at the three points.

[Item 3]

The roll press device (1) according to Item 2, wherein a first feature amount is defined by the difference between the thickness target value and the second point thickness measurement value, a second feature amount is defined by the sum of the difference between the second point thickness measurement value and the first point thickness measurement value and the difference between the second point thickness measurement value and the third point thickness measurement value, and a third feature amount is defined by the difference between the first point thickness measurement value and the third point thickness measurement value. This allows the profiling of the thickness in the width direction of the electrode plate (2) with high accuracy based on the three feature amounts.

[Item 4]

The roll press device (1) according to Item 1, wherein the calculation unit (814-816) approximates a quadratic or higher function by the least squares method on the basis of thickness measurement values at a plurality of points that are based on the detection values from the thickness meter (70), calculates the quadratic coefficient and the linear coefficient of the approximated function, uses the quadratic coefficient as the quadratic component of the thickness profile of the electrode plate (2), and uses the linear coefficient as the linear component of the thickness profile of the electrode plate (2). This allows for the improvement in the accuracy of thickness control on the electrode plate (2) using the least squares method based on the thickness measurement values at the three or more points.

[Item 5]

The roll press device (1) according to any one of Item 1 through Item 4, wherein the calculation unit (814-816) calculates the respective pressure setting values of the first press mechanism (41), the second press mechanism (42), the first bend mechanism (51), and the second bend mechanism (52) such that all the three feature amounts become zero. This allows the thickness of the electrode plate (2) to be converged to the target thickness value in a flat state over the entire width.

[Item 6]

The roll press device (1) according to any one of Item 1 through Item 5, wherein the thickness meter (70) causes one thickness detection sensor to scan the electrode plate 2 in the width direction so as to continuously detect the thickness of the electrode plate (2) and extracts the thickness detection values at the three or more points. This allows the number of thickness detection sensors to be reduced.

[Item 7]

The roll press device (1) according to any one of Item 1 through Item 5, wherein the thickness meter (70) detects the respective thicknesses at the three or more points by three or more thickness detection sensors. This allows the control of each of the thickness detection sensors to be simplified.

[Item 8]

The roll press device (1) according to Item 6 or 7, further comprising;

a thickness measurement value calculation unit (821) that filters each of the three or more thickness detection values detected by the thickness meter (70) in the longitudinal direction of the electrode plate (2) and calculates the thickness measurement values at the three or more points. This allows noise in the detection values to be removed.

[Item 9]

The roll press device (1) according to any one of Item 1 through Item 8, wherein after changing the respective pressure setting values of the first press mechanism (41), the second press mechanism (42), the first bend mechanism (51), and the second bend mechanism (52), the calculation unit (814-816) suspends the next change in the respective pressure setting values of the first press mechanism (41), the second press mechanism (42), the first bend mechanism (51), and the second bend mechanism (52) until predetermined conditions regarding the pass line length from a press position to the thickness meter (70) and the time until the change in the pressure setting values is reflected in the actual output are satisfied. This allows unnecessary or excessive changes in the pressure setting value of the press mechanism and/or the bend mechanism to be avoided.

[Item 10]

A control device (80) used in a roll press device comprising:

- a first pressure roller (11) and a second pressure roller (12) that sandwich an electrode plate (2) of a secondary battery that is continuously conveyed, thereby rolling the electrode plate (2);
- a first main bearing part (21) and a second main bearing part (22) that are provided on one side and the other side of a rotating shaft of the first pressure roller (11), respectively, and that rotatably support the rotating shaft;
- a third main bearing part (23) and a fourth main bearing part (24) that are provided on one side and the other side of a rotating shaft of the second pressure roller (12), respectively, and that rotatably support the rotating shaft;
- a first bend bearing part (31) and a second bend bearing part (32) that are provided on one side and the other side of a rotating shaft of the first pressure roller (11), respectively, and that rotatably support the rotating shaft;
- a third bend bearing part (33) and a fourth bend bearing part (34) that are provided on one side and the other side of a rotating shaft of the second pressure roller (12), respectively, and that rotatably support the rotating shaft;
- a first press mechanism (41) that is capable of applying a load to at least one of the first main bearing part (21) and the third main bearing part (23) in a direction in which the first pressure roller (11) and the second pressure roller (12) become close to each other;
- a second press mechanism (42) that is capable of applying a load to at least one of the second main bearing part (22) and the fourth main bearing part (24) in a direction in which the first pressure roller (11) and the second pressure roller (12) become close to each other;
- a first bend mechanism (51) that is capable of applying a load to the first bend bearing part (31) and the third bend bearing part (33) in a direction in which the first pressure roller (11) and the second pressure roller (12) become separated from or close to each other;
- a second bend mechanism (52) that is capable of applying a load to the second bend bearing part (32) and the fourth bend bearing part (34) in a direction in which the first pressure roller (11) and the second pressure roller (12) become separated from or close to each other; and
- a thickness meter (70) that is provided on the exit side of the first and second pressure rollers (11) and (12) and that detects the thickness of the electrode plate (2) of the secondary battery at three or more points in the width direction of the electrode plate (2), comprising:
- a calculation unit (814-816) that calculates the respective pressure setting values of the first press mechanism (41), the second press mechanism (42), the first bend mechanism (51), and the second bend mechanism (52) on the basis of thickness measurement values at the three or more points that are based on detection values from the thickness meter (70) and of a thickness target value; and
- a pressure control unit (819) that controls each load in the first press mechanism (41), the second press mechanism (42), the first bend mechanism (51), and the second bend mechanism (52) based on the pressure setting values calculated by the calculation unit (814-816), wherein the calculation unit (814-816) calculates three feature amounts: the deviation between a thickness measurement value at the central point among the three or more points and the thickness target value, the quadratic component of the thickness profile of the electrode plate (2), and the linear component of the thickness profile of the electrode plate (2), and adaptively changes the respective pressure setting values of the first press mechanism (41), the second press mechanism (42), the first bend mechanism (51), and the second bend mechanism (52) based on the three feature amounts. This allows for the improvement in the accuracy of thickness control on the electrode plate (2) by the roll press device (1).

REFERENCE SIGNS LIST 1 roll press device
2 electrode plate
11 first pressure roller
12 second pressure roller
13 unwinder
14 winder
15 motor
16 pulse generator
21 first main bearing part
22 second main bearing part
23 third main bearing part
24 fourth main bearing part
31 first bend bearing part
32 second bend bearing part
33 third bend bearing part
34 fourth bend bearing part
41 first press mechanism
42 second press mechanism
41a first press cylinder
41b first electric screw-down device
42a second press cylinder
42b second electric screw-down device
51 first bend mechanism
52 second bend mechanism
61 first preload mechanism
62 second preload mechanism
70 thickness meter
80 control device
81 first control panel 811 length measurement unit
812 acquisition timing generation unit
813 thickness measurement value acquisition unit
814 feature amount calculation unit
815 correction value calculation unit
816 pressure setting value correction unit
817 pressure deviation calculation unit
818 PID control unit
819 pressure control unit
82 second control panel
821 thickness measurement value calculation unit

The invention claimed is:

1. A roll press device comprising:
a first pressure roller and a second pressure roller that sandwich an electrode plate of a secondary battery that is continuously conveyed, thereby rolling the electrode plate;
a first main bearing part and a second main bearing part that are provided on one side and the other side of a rotating shaft of the first pressure roller, respectively, and that rotatably support the rotating shaft;
a third main bearing part and a fourth main bearing part that are provided on one side and the other side of a rotating shaft of the second pressure roller, respectively, and that rotatably support the rotating shaft;
a first bend bearing part and a second bend bearing part that are provided on one side and the other side of the rotating shaft of the first pressure roller, respectively, and that rotatably support the rotating shaft;
a third bend bearing part and a fourth bend bearing part that are provided on one side and the other side of the rotating shaft of the second pressure roller, respectively, and that rotatably support the rotating shaft;
a first press mechanism including a first press cylinder that is configured to apply a load to at least one of the first main bearing part and the third main bearing part in a direction in which the first pressure roller and the second pressure roller become close to each other;
a second press mechanism including a second press cylinder that is configured to apply a load to at least one of the second main bearing part and the fourth main bearing part in the direction in which the first pressure roller and the second pressure roller become close to each other;
a first bend mechanism including a first bend cylinder that is configured to apply a load to the first bend bearing part and the third bend bearing part in a direction in which the first pressure roller and the second pressure roller become separated from or close to each other;
a second bend mechanism including a second bend cylinder that is configured to apply a load to the second bend bearing part and the fourth bend bearing part in the direction in which the first pressure roller and the second pressure roller become separated from or close to each other;
a thickness meter that is provided on an exit side of the first and second pressure rollers and that detects a thickness of the electrode plate of the secondary battery at three or more points in a width direction of the electrode plate;
a logic controller that calculates respective pressure setting values of the first press mechanism, the second press mechanism, the first bend mechanism, and the second bend mechanism on the basis of thickness measurement values at the three or more points that are based on detection values from the thickness meter and of a thickness target value; and
an actuator controller that controls each load in the first press mechanism, the second press mechanism, the first bend mechanism, and the second bend mechanism based on the pressure setting values calculated by the logic controller, wherein
the logic controller calculates three feature amounts: a deviation between a thickness measurement value at a central point among the three or more points and the thickness target value, a quadratic component of a thickness profile of the electrode plate, and a linear component of the thickness profile of the electrode plate, and adaptively changes the respective pressure setting values of the first press mechanism, the second press mechanism, the first bend mechanism, and the second bend mechanism based on the three feature amounts,
the three or more points at which the thickness meter detects the thickness of the electrode plate of the secondary battery include:
a first point that is set at a first end of the electrode plate of the secondary battery on the side where the first press mechanism is provided;
a second point that is set at a center part of the electrode plate of the secondary battery; and
a third point that is set at a second end of the electrode plate of the secondary battery on the side where the second press mechanism is provided,
the thickness meter detects the thickness of the electrode plate of the secondary battery at the first point, the second point, and the third point arranged in the width direction of the electrode plate,
the logic controller calculates the respective pressure setting values of the first press mechanism, the second press mechanism, the first bend mechanism, and the second bend mechanism on the basis of a first point thickness measurement value, a second point thickness measurement value, and a third point thickness measurement value that are based on detection values from the thickness meter and of the thickness target value,
from the first point thickness measurement value, the second point thickness measurement value, the third point thickness measurement value, and the thickness target value, the logic controller calculates the three feature amounts: the deviation between the second point thickness measurement value and the thickness target value, the quadratic component of the thickness profile of the electrode plate, and the linear component of the thickness profile of the electrode plate,
the quadratic component of the thickness profile of the electrode plate is a sum of a difference between the second point thickness measurement value and the first point thickness measurement value and a difference between the second point thickness measurement value and the third point thickness measurement value, and
the linear component of the thickness profile of the electrode plate is a difference between the first point thickness measurement value and the third point thickness measurement value.

2. The roll press device according to claim 1, wherein the logic controller approximates a quadratic or higher function by the least squares method on the basis of thickness measurement values at the three or more points that are based on the detection values from the thickness meter, calculates a quadratic coefficient and a linear coefficient of the approximated function, uses the quadratic coefficient as the quadratic component of the thickness profile of the electrode plate, and uses the linear coefficient as the linear component of the thickness profile of the electrode plate.

3. The roll press device according to claim 1, wherein the logic controller calculates the respective pressure setting values of the first press mechanism, the second press mechanism, the first bend mechanism, and the second bend mechanism such that all the three feature amounts become zero.

4. The roll press device according to claim 1, wherein the thickness meter causes one thickness detection sensor to scan the electrode plate in the width direction so as to continuously detect the thickness of the electrode plate and extracts the thickness detection values at the three or more points.

5. The roll press device according to claim 4, wherein the logic controller that filters each of the three or more thickness detection values detected by the thickness meter in a longitudinal direction of the electrode plate and calculates the thickness measurement values at the three or more points.

6. The roll press device according to claim 1, wherein the thickness meter detects the respective thicknesses at the three or more points by three or more thickness detection sensors.

7. The roll press device according to claim 1, wherein after changing the respective pressure setting values of the first press mechanism, the second press mechanism, the first bend mechanism, and the second bend mechanism, the logic controller suspends a next change in the respective pressure setting values of the first press mechanism, the second press mechanism, the first bend mechanism, and the second bend mechanism until predetermined conditions regarding a pass line length from a press position to the thickness meter and time until the change in the pressure setting values is reflected in the actual output are satisfied.

8. A control device used in a roll press device comprising:
a first pressure roller and a second pressure roller that sandwich an electrode plate of a secondary battery that is continuously conveyed, thereby rolling the electrode plate;
a first main bearing part and a second main bearing part that are provided on one side and the other side of a rotating shaft of the first pressure roller, respectively, and that rotatably support the rotating shaft;
a third main bearing part and a fourth main bearing part that are provided on one side and the other side of a rotating shaft of the second pressure roller, respectively, and that rotatably support the rotating shaft;
a first bend bearing part and a second bend bearing part that are provided on one side and the other side of the rotating shaft of the first pressure roller, respectively, and that rotatably support the rotating shaft;
a third bend bearing part and a fourth bend bearing part that are provided on one side and the other side of the rotating shaft of the second pressure roller, respectively, and that rotatably support the rotating shaft;
a first press mechanism including a first press cylinder that is configured to apply a load to at least one of the first main bearing part and the third main bearing part in a direction in which the first pressure roller and the second pressure roller become close to each other;
a second press mechanism including a second press cylinder that is configured to apply a load to at least one of the second main bearing part and the fourth main bearing part in the direction in which the first pressure roller and the second pressure roller become close to each other;
a first bend mechanism including a first bend cylinder that is configured to apply a load to the first bend bearing part and the third bend bearing part in a direction in which the first pressure roller and the second pressure roller become separated from or close to each other;
a second bend mechanism including a second bend cylinder that is configured to apply a load to the second bend bearing part and the fourth bend bearing part in the direction in which the first pressure roller and the second pressure roller become separated from or close to each other; and
a thickness meter that is provided on an exit side of the first and second pressure rollers and that detects a thickness of the electrode plate of the secondary battery at three or more points in a width direction of the electrode plate, comprising:
a logic controller that calculates respective pressure setting values of the first press mechanism, the second press mechanism, the first bend mechanism, and the second bend mechanism on the basis of thickness measurement values at the three or more points that are based on detection values from the thickness meter and of a thickness target value; and
an actuator controller that controls each load in the first press mechanism, the second press mechanism, the first bend mechanism, and the second bend mechanism based on the pressure setting values calculated by the logic controller, wherein
the logic controller calculates three feature amounts: a deviation between a thickness measurement value at a central point among the three or more points and the thickness target value, a quadratic component of a thickness profile of the electrode plate, and a linear component of the thickness profile of the electrode plate, and adaptively changes the respective pressure setting values of the first press mechanism, the second press mechanism, the first bend mechanism, and the second bend mechanism based on the three feature amounts,
the three or more points at which the thickness meter detects the thickness of the electrode plate of the secondary battery include:
a first point that is set at a first end of the electrode plate of the secondary battery on the side where the first press mechanism is provided;
a second point that is set at a center part of the electrode plate of the secondary battery; and
a third point that is set at a second end of the electrode plate of the secondary battery on the side where the second press mechanism is provided,
the thickness meter detects the thickness of the electrode plate of the secondary battery at the first point, the second point, and the third point arranged in the width direction of the electrode plate,
the logic controller calculates the respective pressure setting values of the first press mechanism, the second press mechanism, the first bend mechanism, and the second bend mechanism on the basis of a first point thickness measurement value, a second point thickness measurement value, and a third point thickness measurement value that are based on detection values from the thickness meter and of the thickness target value,
from the first point thickness measurement value, the second point thickness measurement value, the third point thickness measurement value, and the thickness target value, the logic controller calculates the three feature amounts: the deviation between the second point thickness measurement value and the thickness target value, the quadratic component of the thickness profile of the electrode plate, and the linear component of the thickness profile of the electrode plate, the quadratic component of the thickness profile of the electrode plate is a sum of a difference between the second point thickness measurement value and the first point thickness measurement value and a difference between the second point thickness measurement value and the third point thickness measurement value, and the linear component of the thickness profile of the electrode plate is a difference between the first point thickness measurement value and the third point thickness measurement value.

* * * * *